May 4, 1965 H. B. NANKERVIS 3,181,498
HOLD METERS
Filed Feb. 26, 1963
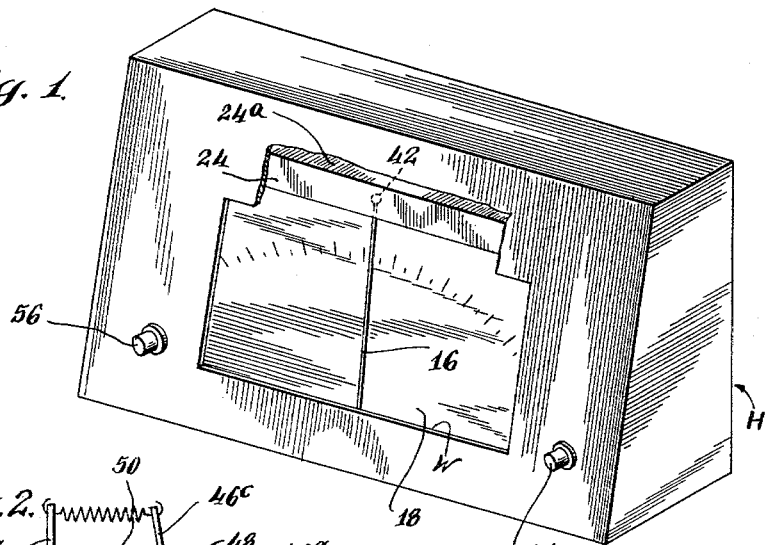
Fig. 1.
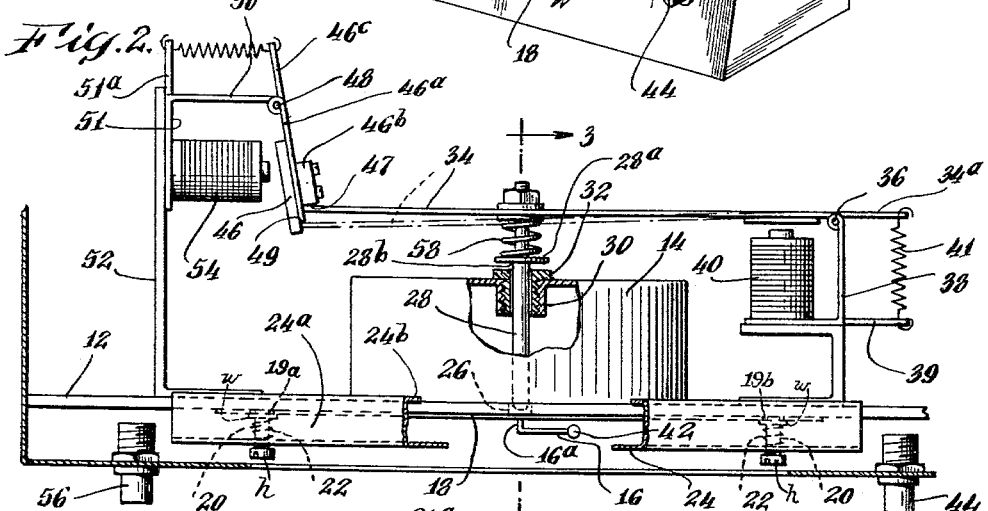
Fig. 2.
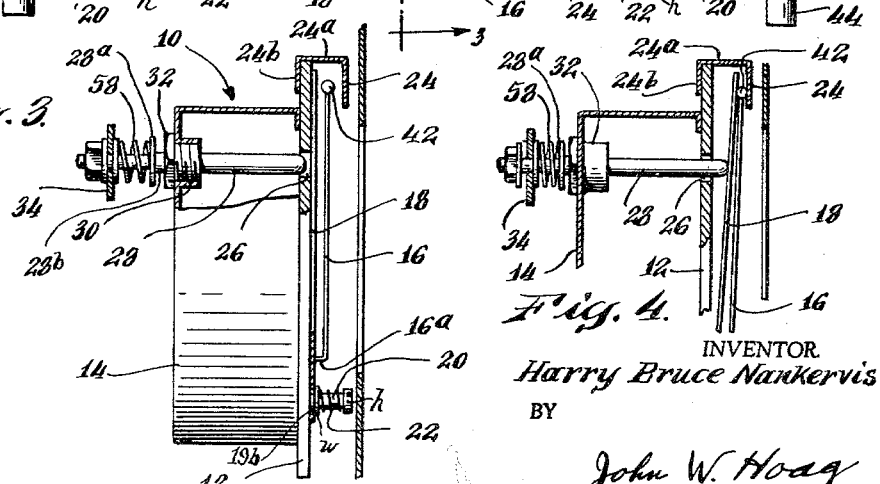
Fig. 3.
Fig. 4.
INVENTOR.
*Harry Bruce Nankervis*
BY
*John W. Hoag*
ATTORNEY.

United States Patent Office 3,181,498
Patented May 4, 1965

3,181,498
HOLD METERS
Harry Bruce Nankervis, Middletown, N.J., assignor to Stephenson Corporation, Red Bank, N.J., a corporation of New Jersey
Filed Feb. 26, 1963, Ser. No. 261,017
4 Claims. (Cl. 116—129)

This invention relates to hold meters which is a general term used to designate means used in connection with a meter to clamp the meter arm and thus hold it recording a particular reading.

While the invention is applicable to meters generally, it is illustrated herein in connection with a speedometer of a kind used by the police in measuring the speed of automobiles by radar.

An object of the invention is to provide a device of the above-described kind which is simple and dependable in action.

The invention will be best understood if the following description is read in connection with the drawings in which;

FIGURE 1 is a perspective view looking at the front of a speedometer embodying the invention.

FIGURE 2 is a top plane view partly broken away and in cross section.

FIGURE 3 is a vertical transverse section taken on the line 3—3 of FIGURE 2, showing the plunger in its normal, nonoperating position; and FIGURE 4 is a view similar to FIGURE 3 showing the plunger in its forward position with the top of the meter arm or needle clamped between the dial plate and the clamp plate.

In the embodiment of the invention disclosed herein the numeral 10 indicates a meter case comprising the front or face plate 12 and the rearwardly extending portion 14 which encloses operating mechanism for swinging the needle or meter arm 16 back and forth across the calibrated face plate or dial 18. The dial plate 18 is mounted adjacent its lower edge on the headed pins 20 which extend through washers $w$ and dial plate 18 into plate 12 adjacent the respective lateral edges of the dial plate. The apertures 19$a$ and 19$b$ in the dial plate 18 through which the pins 20 extend are large enough to allow plate 18 to have a swinging action toward and away from the plate 12 of the case. The lower portion of plate 18 is yieldingly urged against the front plate 12 of the case by the springs 22 which surround the pins and are attached at their inner ends to the washers $w$ respectively; and are compressed between the heads $h$ of the pins and the outer surface of the dial plate.

The meter arm or needle 16 has the lower portion 16$a$ which is bent inwardly at right angles and extends through the dial plate 18, and through the front plate 12 of the meter case, into the casing 14 which contains the mechanism for swinging the arm 16 back and forth across the dial plate 18 in response to changes in whatever condition the meter measures. This mechanism may be of known kind such as the well known D'Arsonval meter movement, and since it does not comprise any part of this invention, it is not described herein.

A clamp plate 24 is provided extending down in advance of the meter arm 16 for a distance below the top of the meter arm. Clamp plate 24 may be supported in a variety of ways but as shown here it is an angle member having portion 24$a$ extending rearwardly from the clamp plate 24 to space the clamp plate in front of the dial plate 18 and the needle 16, and a portion 24$b$ which is bent downwardly behind the front plate 12 and secured to the rear of plate 12, as by welding.

The front plate 12 of the case is provided with an aperture 26, preferably located above the horizontal midline of the case, and a plunger 28 is provided extending through the meter case portion 14, the rear surface of which is apertured at 30 to receive the sleeve 32 within which the plunger 28 reciprocates. Plunger 28 is attached adjacent its rear end to the arm 34 which is pivotally mounted on the pivot pin 36 supported by the bracket 38 which extends rearwardly from the plate 12 of the case. Arm 34 is an armature which is actuated by the electro magnet 40 which is also supported by the bracket 38. A spring 41 is provided between the extension 34$a$ of arm 34 and the bracket extension member 39 and urges arm 34 to move outwardly away from electro magnet 40. When the electro magnet 40 is actuated the arm 34 is caused to swing inwardly on its pivot 36, against the force of spring 41, and carries forward with it the plunger 28, the head of which then passes through aperture 26 in plate 12 into contact with the dial plate 18 causing the dial plate to pivot on pins 20 and swing outwardly until it contacts the top of the needle and clamps the needle between itself and the inner surface of clamp plate 24. For making this clamping action more effective the upper end of the needle is enlarged with the head 42. When the plunger 28 has moved forward and the needle is being clamped between the dial plate 28 and the clamp plate 24 the arm 34 is latched in its advance position so that it is not necessary to continue to depress the button 44 which is used to actuate electro magnet 40 by closing an electric circuit which is the solenoid and a battery (not shown), which may be the battery of a car in which a policeman who is operating the radar is sitting.

The latching means comprises the arm 46 which is carried by arm 46$a$ which is pivoted on pivot pin 48 which is supported for rotation by arm 50 of a bracket comprising also the arm 51 which is mounted on the arm 52 of a bracket which extends rearwardly from the plate 12. An electro magnet 54 is supported on bracket arm 51 and extends toward arm 46 which is the armature for electro magnet 54. Normally the free end of arm 34 rests against stop 47 on arm 46 but when arm 34 moves in to actuate plunger 28 its free end moves inwardly beyond the inner end 49 of member 46$a$. When this occurs arm 46, 46$a$ is caused by spring 55 to swing inwardly a distance equal to the thickness of member 46$a$. The action of spring 41 then swings arm 34 outwardly again a very short distance into contact with stop 49 where it is locked until electro magnet 54 is actuated. When electro magnet 54 is actuated by depressing button 56 member 46 is swung in toward electro magnet 54 sufficiently to free arm 34 from the stop 49 which allows spring 41 to move it back to its normal, nonoperating position in which the free end of member 34 abuts against the stop 47. Superimposed on it the two members 46$a$ and 46$b$ the lower ends of which are stepped relative to one and the lower end of arm 46 providing the stops 47 and 49. A spring 55 is provided between the extension 51$a$ of bracket arm 51 and the extension 46$c$ of member 46$a$ and urges arm 46 to move outwardly away from electro magnet 54.

The spring 58 serves to keep the dial plate in clamping position even while arm 34 is swinging, first inwardly from shoulder 47, beyond shoulder 49 sufficiently to allow arm 46 to be moved outwardly by spring 55, and then slightly outwardly into abutting relation with stop 49. Spring 58 extends around the reduced end portion of plunger 28 between the washer 28$a$, which abuts against the shoulder 28$b$ of the plunger, and the arm 34, and being under tension it keeps pressure on the dial plate at all times when arm 34 is in advance of its inoperative position. Spring 58 thus keeps dial plate 18 in clamping position, preventing release of the needle or metal arm 16 even while arm is moving outwardly slightly into contact with stop 49 after having been moved inwardly from stop 47.

The structure described above is contained within a housing H which preferably has a window W in its front wall, through which the meter arm 16 and the calibrated dial plate 18 is seen.

There has thus been provided an apparatus in which the abovementioned object is accomplished in a thoroughly practical way.

What I claim is:

1. A device for clamping a meter needle which comprises, a meter case including a face plate comprising upper and lower portions, said face plate having an extension disposed in front of, and spaced from, the upper portion of the face plate, a calibrated dial plate disposed between the face plate and its said extension, means operatively carried by said face plate for mounting the dial plate adjacent its lower edge for swing movement between the face plate and its extension and including means normally holding the dial plate in a plane substantially parallel with the face plate, said meter case defining a passage extending through it substantially at right angles to the dial plate, an indicating needle extending from the meter case up over the outer surface of the dial plate with its free end disposed between the dial plate and the extension of the face plate, a plunger adapted to be reciprocated within the said passage through the meter case, and means for moving the plunger between a position in which its forward end does not affect the normal position of the dial plate to a position in which it has contacted the dial plate and swung it outwardly to a position in which its upper portion clamps the top of the needle against the inner surface of the face plate extension.

2. A device for clamping a meter needle which comprises, a meter case including, a face plate having upper and lower portions, a needle clamp plate disposed in front of the upper portion of the face plate, means for supporting the clamp spaced outwardly from the face plate, and a calibrated dial plate disposed between the face plate and the clamp plate, said dial plate having a plurality of apertures in its lower portion, pins mounted on the face plate and extending through said apertures, said apertures being sufficiently larger in diameter than the pins to permit swinging movement of the dial plate while it is supported on said pins, spring means carried by the pins and yieldingly urging the dial plate into a plane substantially parallel with the face plate, an indicating needle mounted for rotation within the meter case and extending through the face plate of the meter case, and through the dial plate, and extending up over the outer surface of the dial plate with its free end disposed between the dial plate and the clamp plate, a plunger mounted on said meter case for reciprocating movement in a direction substantially at right angles to the face plate and between a position in which its forward end does not affect the normal position of the dial plate to a position in which it has contacted the dial plate and swung it outwardly to a position in which its upper portion clamps the top of the needle against the inner surface of the clamp plate, means for actuating the plunger to move forward into clamping position, and means for returning the plunger to its normal non-operative position.

3. A device for clamping a meter needle to hold it at a recorded reading which comprises, a case, a dial plate hinged adjacent its lower edge to said case, an indicating meter arm mounted for rotation across the face of the dial plate, means for swinging the meter arm across the face of the dial plate to indicate changes in a condition to be measured, a clamp plate extending down beyond and in front of the top of the meter arm, means for supporting the clamp plate from the case, and means for swinging the dial plate on its hinge means to engage and hold the meter arm between the dial plate and the clamp plate comprising, a pivotally mounted arm, means normally holding the arm in nonoperating position, a plunger loosely carried by the arm for movement toward and away from the dial plate, means for actuating the arm to carry the plunger from nonoperating posiiton into contact with the dial plate and to move it into position to clamp the meter arm between itself and the clamp plate, a second pivotally mounted arm for locking the first arm in operating position, said arm having a plurality of spaced apart and stepped stops, mounting means for the second arm, and means urging said second arm toward the free end of the first arm, and means for actuating the second arm to move away from the free end of the first arm, and spring means disposed between the first arm and the plunger for holding the dial plate in clamping position while the first arm is moving from nonoperating position into a position in which it is locked in operating position.

4. A device for clamping a meter needle to hold it at a recorded reading which comprises, a meter case including a face plate, pins projecting from the lower portion of the face plate adjacent its lower edge, a dial plate having apertures adapted to register with the pins respectively and large enough to permit the dial plate to be supported on said pins for swinging movement toward and away from the face plate, resilient means operatively associated with said pins for normally holding the dial plate substantially parallel to the face plate, an indicating meter needle extending from within the meter case and mounted for rotation across the face of the dial plate, a clamp plate extending down beyond and in front of the top of the meter needle, and means for swinging the dial plate and said pins to engage and hold the upper end of the meter arm between itself and the clamp plate.

References Cited by the Examiner

FOREIGN PATENTS 447,242    7/27    Germany.

LOUIS J. CAPOZI, *Primary Examiner.*

UNITED STATES PATENT OFFICE
CERTIFICATE OF CORRECTION

Patent No. 3,181,498                        May 4, 1965

Harry Bruce Nankervis

It is hereby certified that error appears in the above numbered patent requiring correction and that the said Letters Patent should read as corrected below.

Column 2, line 57, after "one" insert -- another --; column 4, line 50, for "and", second occurrence, read -- on --.

Signed and sealed this 14th day of September 1965.

(SEAL)
Attest:

ERNEST W. SWIDER
Attesting Officer

EDWARD J. BRENNER
Commissioner of Patents